US006295266B1

(12) United States Patent
Lee et al.

(10) Patent No.: US 6,295,266 B1
(45) Date of Patent: Sep. 25, 2001

(54) DISK PLAYER

(75) Inventors: Ju-Hyung Lee; Byung-sam Son, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/114,914

(22) Filed: Jul. 14, 1998

(30) Foreign Application Priority Data

Jul. 14, 1997 (KR) .................................................. 97-32670

(51) Int. Cl.[7] .................................................. G11B 33/02
(52) U.S. Cl. .................................................. 369/77.1
(58) Field of Search .................. 369/75.2, 77.1, 369/77.2; 360/99.03, 99.07

(56) References Cited

U.S. PATENT DOCUMENTS 5,251,195 * 10/1993 Kawakami et al. ................. 369/75.2

FOREIGN PATENT DOCUMENTS 1-98160    4/1989  (JP) .
3-147562   6/1991  (JP) .

* cited by examiner

*Primary Examiner*—George J. Letscher
(74) *Attorney, Agent, or Firm*—Robert E. Bushnell, Esq.

(57) ABSTRACT

A disk player comprising a housing, a disk tray movably installed to be inserted into and to be extracted from the housing in order to place a disk in or take a disk out of the housing, a turntable rotatably installed in the housing and on which the disk placed in the housing is laid, an optical pickup slidably installed in the housing for reading information recorded on the disk placed on the turntable, a driving motor installed in the housing, a tray driving unit for moving the disk tray by power transferred from the driving motor, an optical pickup transfer unit for moving the optical pickup by power transferred from the driving motor, and a clutch unit for selectively transferring power of the driving motor to the tray driving unit or the optical pickup transfer unit.

6 Claims, 17 Drawing Sheets

DISK PLAYER

CLAIM OF PRIORITY

This application makes reference to, incorporates the same herein, and claims all benefits accruing under 35 U.S.C. § 119 from an application entitled Disk Player earlier filed in the Korean Industrial Property Office on the 14th day of July 1997, and there duly assigned Ser. No. 97-32670, a copy of which is annexed hereto.

BACKGROUND OF THE INVENTION

1. Technical Field

The present invention relates to a disk player, and more particularly, to a disk player having an improved loading unit of a disk tray and an improved feeding unit of an optical pickup.

2. Related Art

In general, a compact disk-read only memory (CD ROM) player is provided with a housing and a disk tray movably installed to be inserted into and to be extracted from the housing in order to place a compact disk (CD) in or take a compact disk out of the housing. A turntable on which the compact disk carried by the disk tray is laid and a chuck to clamp the compact disk laid on the turntable are provided in the housing. Further, an optical pickup which irradiates a light beam onto the clamped compact disk to read information recorded on the compact disk is slidably installed to be movable in a radial direction of the compact disk.

However, in a conventional disk player, two motors are separately provided. The first motor is used to insert the disk tray into or extract the disk tray out of the housing. The second motor is used to transport the optical pickup. Therefore, there are problems in that the whole configuration of the disk player is complicated, the disk player is relatively heavy and the production cost of the disk player is high.

Disk players are disclosed in U.S. Pat. No. 5,563,865 for Compact Disk Transport Tray Moved by a Disk Reading Mechanism issued to Wheeler, U.S. Pat. No. 5,119,357 for Disc Player with a Single Motor Coupled to a Disc Transport Mechanism and to a Pickup Transport Mechanism issued to Tsurata et al., U.S. Pat. No. 5,633,850 for Optical Disc Player Having an Apparatus for Transferring Both a Disc Tray and an Optical Pickup issued to Park, U.S. Pat. No. 5,473,593 for Compact Disk Transport Tray Moved by a Disk Reading Mechanism issued to Wheeler, U.S. Pat. No. 5,313,351 for Twin Disk Player issued to Lee, and U.S. Pat. No. 4,701,901 for Disk Player issued to Imai.

Although various disk players currently exist, I have discovered that there is a need to provide an improved disk player with a lowered production cost.

SUMMARY OF THE INVENTION

Accordingly, to solve the above problems, it is an objective of the present invention to provide a disk player whose size can be minimized, weight can be reduced, and production cost can be reduced by improving a loading unit of a disk tray and a feeding unit of an optical pickup.

In addition, to achieve the above objectives and others, there is provided a disk player comprising a housing, a disk tray movably installed to be inserted into and to be extracted from the housing in order to place a disk in or take a disk out of the housing, a turntable rotatably installed in the housing on which a disk carried into the housing is laid, and an optical pickup slidably installed in the housing for reading information recorded on the disk laid on the turntable, characterized in that the disk player further comprises a driving motor installed in the housing, a tray driving unit for moving the disk tray by power transferred from the driving motor, an optical pickup transfer unit for moving the optical pickup by power transferred from the driving motor, and a clutch unit for selectively transferring the power of the driving motor to the tray driving unit or the optical pickup transfer unit.

To achieve the above objectives and others, there is provided a disk player comprising a housing, a disk tray movably installed to be inserted into and to be extracted from the housing in order to place a disk in or take a disk out of the housing, a turntable rotatably installed in the housing on which a disk carried into the housing is laid, a chuck installed to be capable of moving toward or away from the turntable in order to clamp the disk laid on the turntable to the turntable, and an optical pickup slidably installed in the housing for reading information recorded on the disk laid on the turntable, characterized in that the disk player further comprises a driving motor installed in the housing, a tray driving unit for moving the disk tray by power transferred from the driving motor, an optical pickup transfer unit for moving the optical pickup by power transferred from the driving motor, a clutch unit for selectively transferring the power of the driving motor to the tray driving unit or the optical pickup transfer unit, and a chuck moving unit to move the chuck simultaneously with the operation of the clutch unit.

To achieve the above objectives and others, there is provided a disk player apparatus, comprising: a housing; a disk tray movably coupled to said housing, moving in a first direction along a first path of conveyance to a first location inside said housing when inserted into said housing, moving in a second direction along the first path of conveyance to a second location outside said housing when ejected from said housing, receiving a disk when positioned at the second location, transporting the disk into said housing when said disk tray is inserted into said housing; a turntable rotatably coupled to said housing receiving the disk; an optical unit movably coupled to said housing reading information recorded on the disk on said turntable, moving along a second path of conveyance within said housing; a motor installed in said housing; a tray driving unit moving said disk tray along the first path of conveyance by power transferred from said motor; an optical unit transfer system moving said optical unit along the second path of conveyance by power transferred from said motor; and a clutch unit selectively transferring power of said motor to a selected one of said tray driving unit and said optical unit transfer system.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
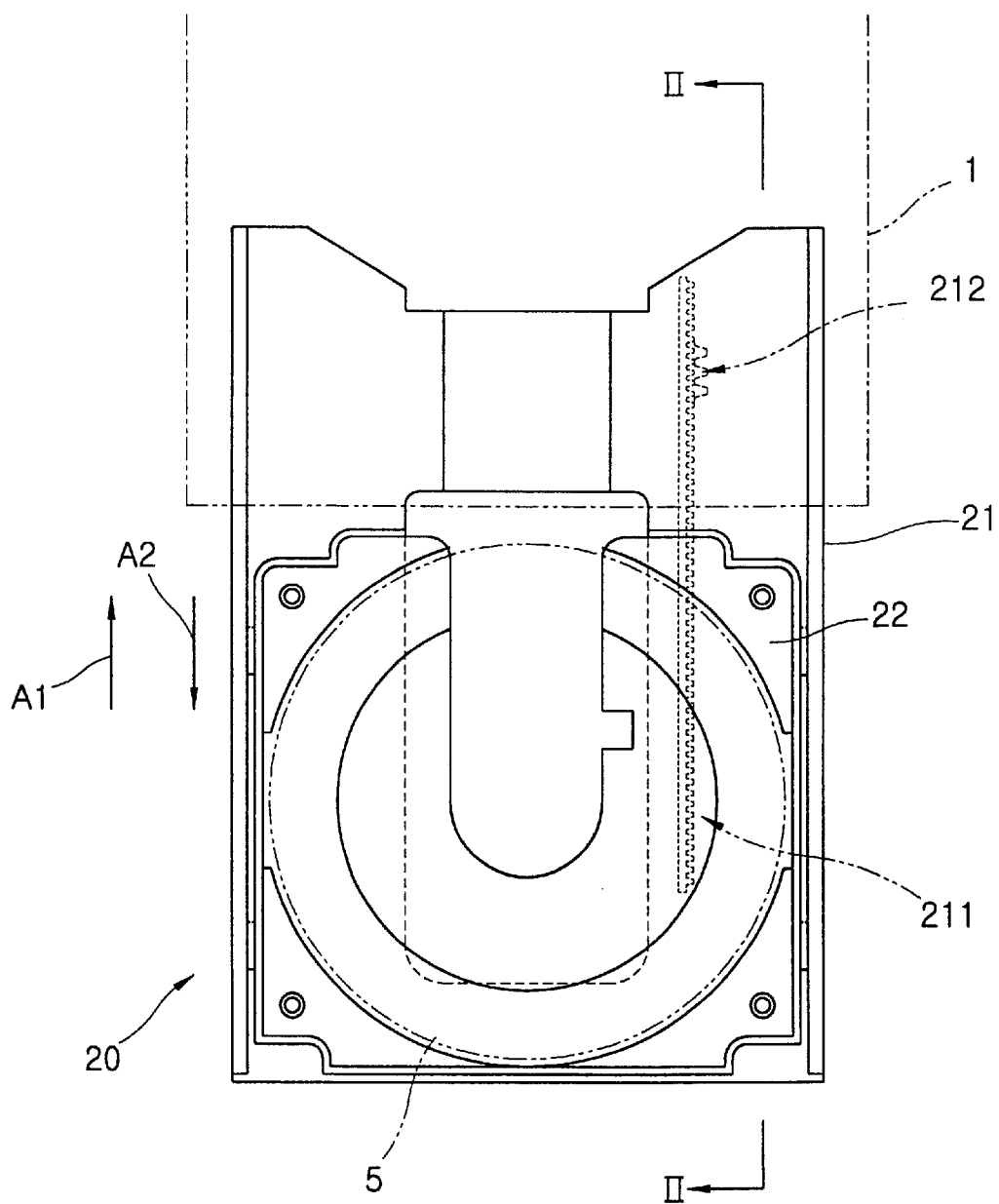
FIG. 1 is a plan view schematically illustrating an embodiment of a disk player, in accordance with the principles of the present invention.

In the following description of the various embodiments of the present invention, the same reference numerals are used in the drawings where the referenced element has the same function or operation to further aid an understanding of the present invention.

Refer now to FIG. 1, which is a plan view schematically illustrating an embodiment of a disk player, in accordance with the principles of the present invention. In addition, refer to FIG. 2, which is a schematic section view taken along line II—II of FIG. 1, in accordance with the principles of the present invention.

Figure 2:
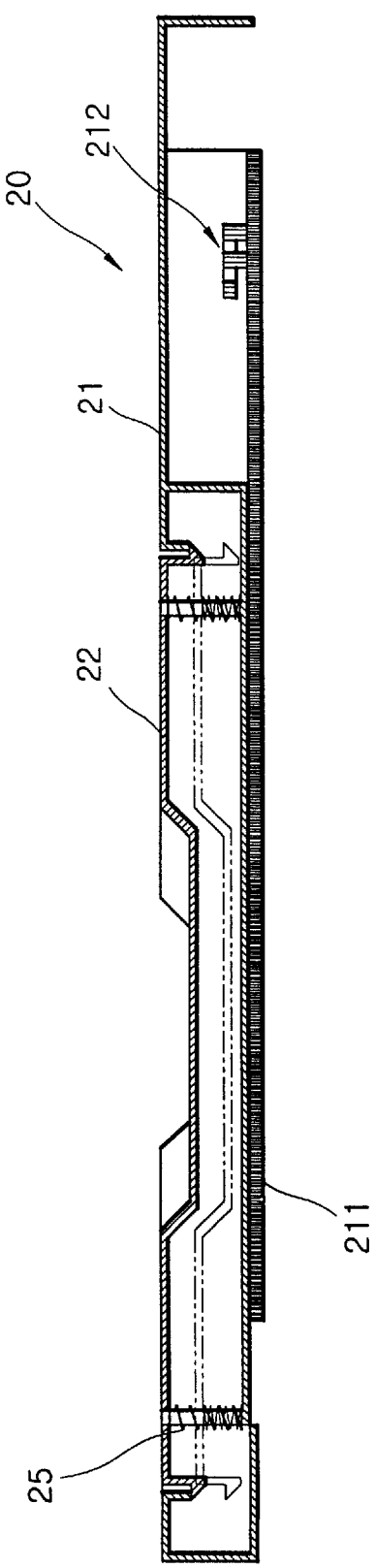
FIG. 2 is a schematic section view taken along line II—II of FIG. 1, in accordance with the principles of the present invention.

Referring to FIGS. 1 and 2, an embodiment of a disk player is provided with a housing 1, and 4 a disk tray 20 installed to be movable in the direction indicated by arrow A1 to be inserted into the housing 1 and in the direction indicated by arrow A2 to be extracted from the housing 1. The disk tray 20 is provided with a tray body 21 and a disk supporter 22. The disk supporter 22 which supports the disk 5 to be transported into or out of the housing 1, is installed and supported by springs 25 to be able to move downwards or upwards as shown in FIG. 2. A first rack portion 211 and a second rack portion 212 are formed at the lower surface of the tray body 21. The first rack portion 211 is extended along the moving direction of the disk tray 20, i.e., the inserting/extracting direction of the disk tray 20. The second rack portion 212 is formed at a level that is different from that of the first rack portion 211.

Figure 3A:
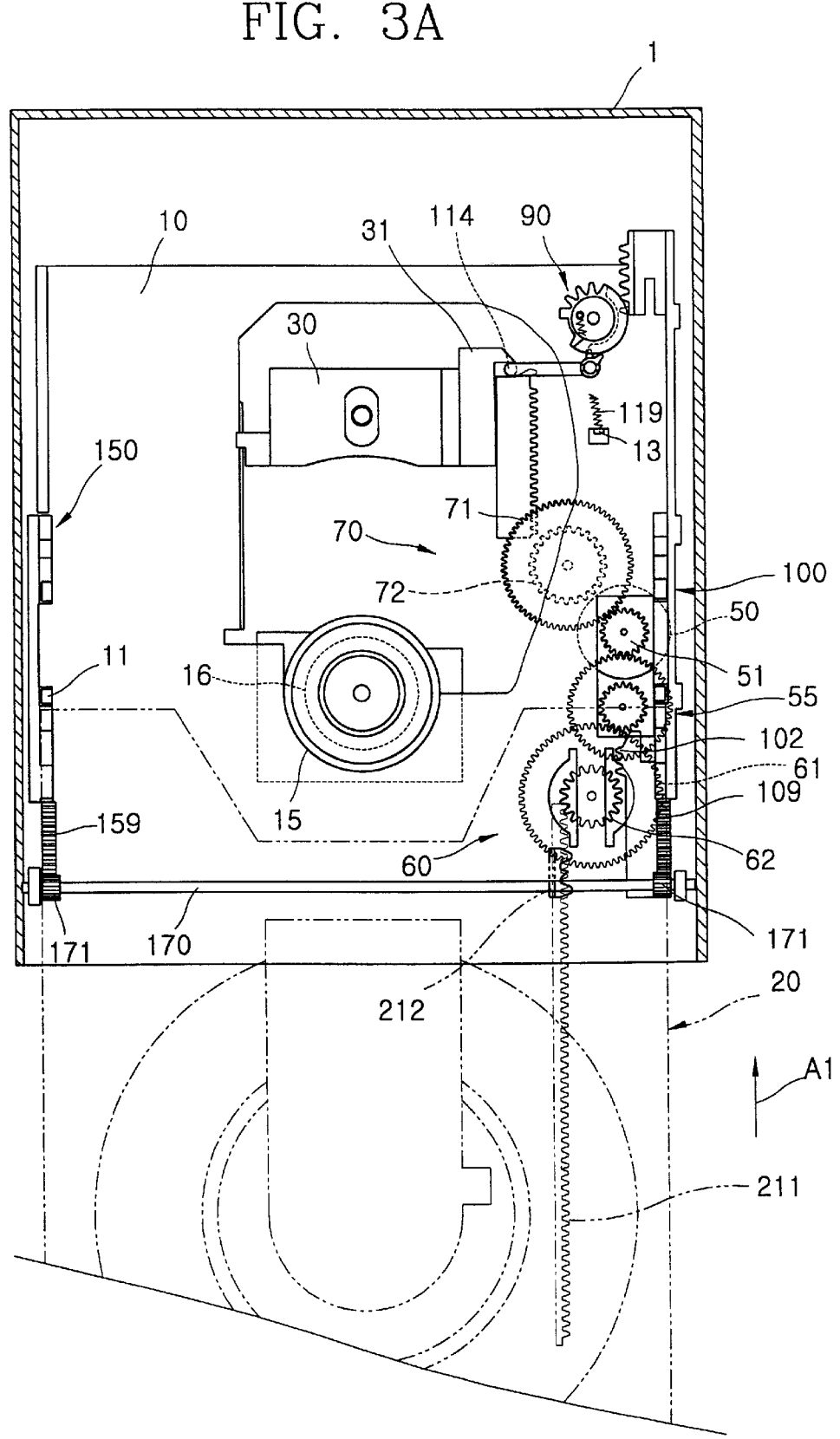
FIG. 3 is a plan view schematically illustrating the inner structure of the housing shown in FIG. 1, in accordance with the principles of the present invention.
Figure 3B:
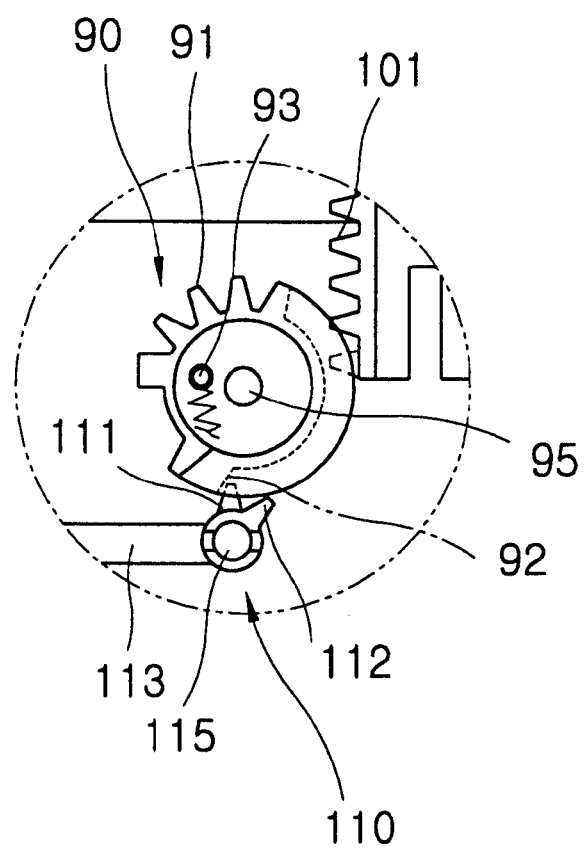

Turn now to FIG. 3, which is a plan view schematically illustrating the inner structure of the housing shown in FIG. 1, in accordance with the principles of the present invention. As shown in FIG. 3, a deck 10 is installed in the housing 1. Installed on the deck 10 are a turntable 15 on which the disk to be transported into the housing 1 by the disk tray 20 is to be laid and an optical pickup 30 which reads information from the disk on the turntable 15. The turntable 15 is fixed to the rotating shaft of a spindle motor 16 fixed to the deck 10 and is able to be rotated by the spindle motor 16. The optical pickup 30 is slidably supported by the deck 10 to be movable toward or away from the turntable 15. As shown in FIG. 3, in a state in which the disk tray 20 is extracted from the housing 1, the optical pickup 30 is positioned away from the turntable 15. A rack member 40 is attached to the optical pickup 30 with intervention of a pushing member 31. The rack portion of a rack member 40 is extended along the sliding direction of the optical pickup 30.

In addition, in the housing 1, as shown in FIG. 3, a driving motor 50, a first gear 60 and a second gear 70 which are driven by the driving motor 50 are installed. The first gear 60 and the second gear 70 are provided with large gears 61 and 71 of a large diameter and small gears 62 and 72 of a small diameter, respectively.

Figure 4:
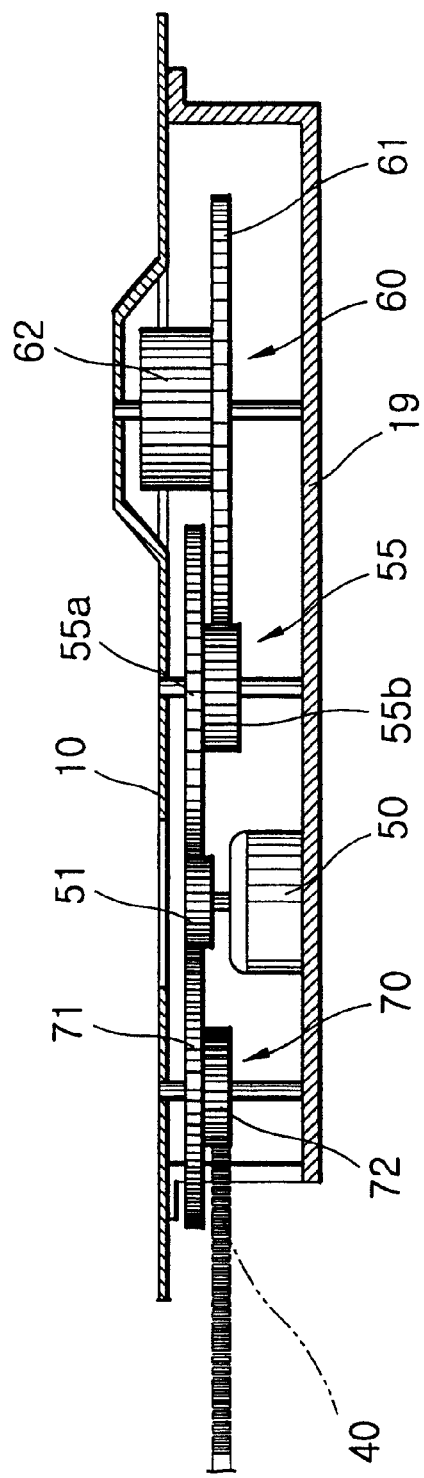
FIG. 4 is a schematic section view illustrating a gear train for transferring the power of the driving motor shown in FIG. 3 to a first gear and a second gear, in accordance with the principles of the present invention.

With continued reference to FIG. 3, refer now to FIG. 4, which is a schematic section view illustrating a gear train for transferring the power of the driving motor shown in FIG. 3 to a first gear and a second gear, in accordance with the principles of the present invention. Referring to FIGS. 3 and 4, the driving motor 50 is supported by a bracket 19 fixed to the deck 10, and a pinion 51 is fixed to the rotating shaft of the driving motor 50. The pinion 51 meshes with a large gear portion 55a of an intermediate gear 55 and the large gear portion 71 of the second gear 70, and a small gear portion 55b of the intermediate gear 55 meshes with the large gear portion 61 of the first gear 60.

As shown in FIG. 3, in a state in which the disk tray 20 is extracted from the housing 1, the small gear portion 62 of the first gear 60 meshes with the first rack portion 211 of the disk tray 20. In a state in which the disk tray 20 is extracted from the housing 1 as shown in FIG. 3, the small gear portion 72 of the second gear 70 does not mesh with the rack member 40. However, in a state in which the disk tray 20 is completely inserted into the housing 1 as will be described below, the small gear portion 72 of the second gear 70 meshes with the rack member 40. The first rack portion 211 and the first gear 60 are included in a tray driving unit for moving the disk tray 20, and the second rack portion 212 and the second gear 70 are included in an optical pickup transfer unit.

In addition, the disk player is provided with a clutch unit for selectively transferring the power of the driving motor 50 to the tray driving unit or the optical pickup transfer unit. In this embodiment, the clutch unit comprises a gear member 90, the second rack portion 212 of the disk he tray 20, a sliding member 100 and a pivoting member 110.

Figure 15:
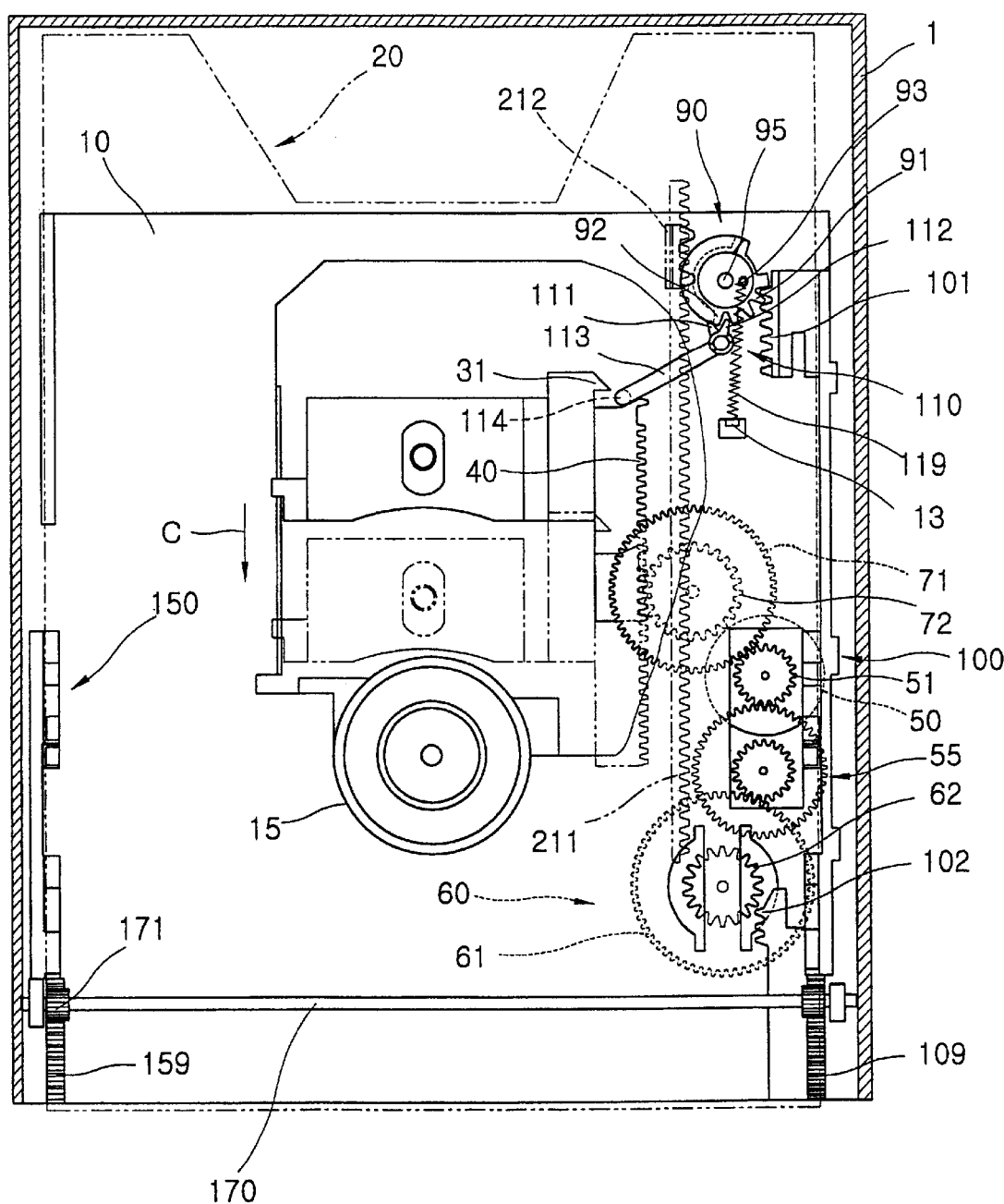

With continued reference to FIG. 3, refer now to FIG. 15, which is a schematic plan view illustrating a state of operation of the present invention, in accordance with the principles of the it present invention. Referring to FIGS. 3 and 15, the gear member 90 is installed on the deck 10 to be able to rotate around a pivot 95, and a gear portion 91 is formed on the outer circumferential surface thereof. The gear member 90 can be rotated between a first rotational position, as shown in FIG. 3, and a second rotational position, as shown in FIG. 15, rotated by a predetermined angle from the first rotational position.

As shown in FIG. 3, when the gear member 90 is positioned at the first rotational position, the gear portion 91 is positioned along the movement path of the second rack portion 212 according to the insertion movement of the disk tray 20. Accordingly, while the disk tray 20 is inserted into the housing 1, the second rack portion 212 is to mesh with the gear portion 91 of the gear member 90. Since a stopper projection 92 formed at the lower surface of the gear member 90 interferes with a tooth 111 of the pivoting member 110, as will be described below, the gear member 90 positioned at the first rotational position is prevented from rotating counterclockwise in FIG. 3. On the other hand, the gear member 90 positioned at the first rotational position is preferably provided with an elastic unit to apply an elastic force to the gear member 90 in order to effectively prevent the gear member 90 from arbitrarily rotating to the second rotational position. In this embodiment, a tension coil spring 119, both ends of which are connected to a connection portion 13 of the deck 10 and a connection portion 93 of the gear member 90, respectively, is provided as the elastic unit.

As shown in FIG. 15, in a state in which the gear member 90 is rotated at the second rotational position, the tension coil spring 119 applies an elastic force to the gear member 90 in order to effectively prevent the gear member 90 from arbitrarily rotating to the first rotational position. In other words, while the gear member 90 is rotated from the first rotational position to the second rotational position, the tension coil spring 119 applies the elastic force to the gear member 90 in the direction it is being rotated to the first rotational position until the connection portion 93 of the gear member 90 reaches a virtual line from the rotational center, i.e., the pivot 95 of the gear member 90 to the connection portion 13 of the deck 10, and to the second rotational position after the connection portion 93 of the gear member 90 passes the virtual line.

As shown in FIG. 3, the sliding member 100 is assembled to the deck 10 to be able to move reciprocally in the moving direction of the disk tray 20. The sliding member 100 is provided with a first clutching rack portion 101 and a second clutching rack portion 102. The first clutching rack portion 101 is able to mesh with the gear portion 91 of the gear member 90 when the gear member 90 is rotated toward the second rotational position, and the second clutching rack portion 102 is able to mesh with the first gear 60 when the sliding member 100 is moved in the direction to be projected from the housing 1.

Figure 5:
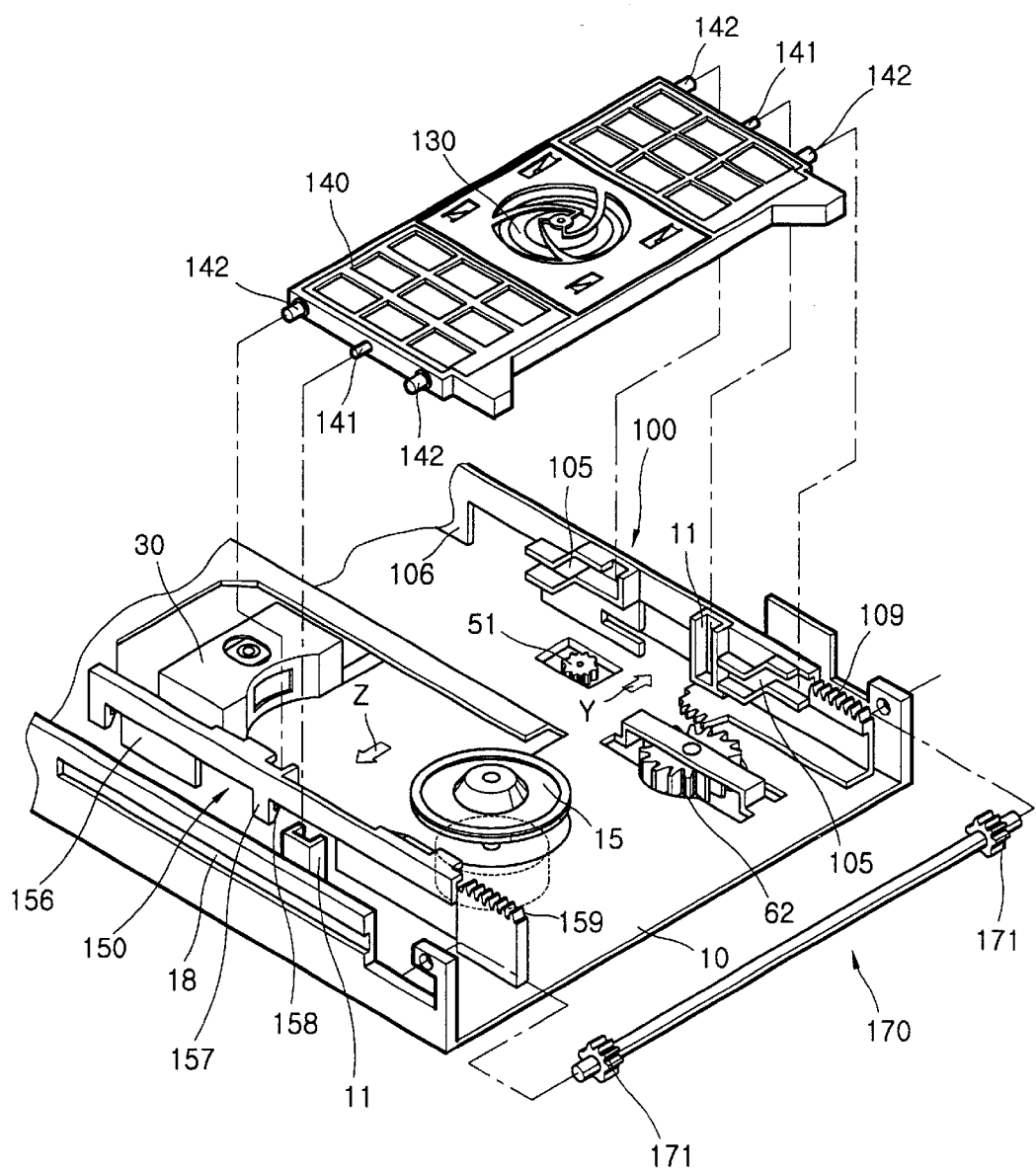
FIG. 5 is an exploded perspective view schematically illustrating the essential portions of the deck shown in FIG. 3, in accordance with the principles of the present invention.
Figure 6:
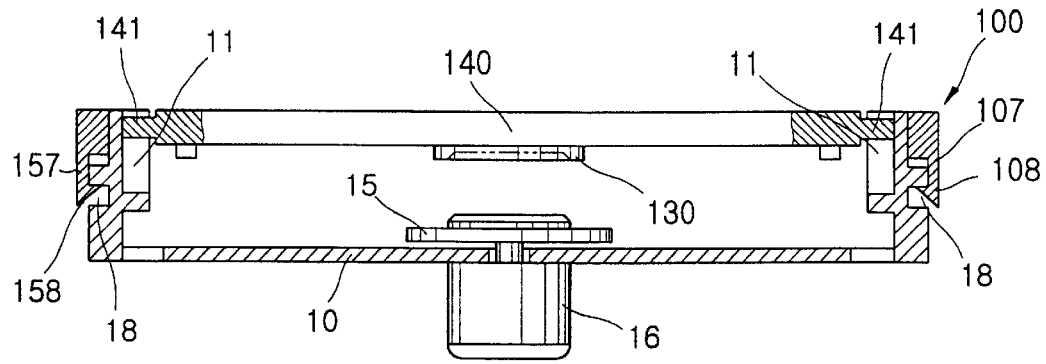
FIG. 6 is a schematic section view of FIG. 5, in accordance with the principles of the present invention.

Refer now to FIG. 5, which is an exploded perspective view schematically illustrating the essential portions of the deck shown in FIG. 3, in accordance with the principles of the present invention. Additionally, refer to FIG. 6, which is a schematic section view of FIG. 5, in accordance with the principles of the present invention. Also, refer to FIG. 7, which is a schematic side view of the sliding member shown in FIG. 5 shown from the perspective in the direction indicated by arrow Y, in accordance with the principles of the present invention. Referring now to FIGS. 3, 5, 6, and 7, slant cam portions 105 are formed at the inner surface of the sliding member 100. The slant cam portions 105 are formed to be slanted with respect to the rotating center line, i.e., the rotating shaft of the spindle motor 16. The sliding member 100 is also provided with an inner wall portion 106 contacting the inner surface of the side wall of the deck 10, an outer wall portion 107 contacting the outer surface of the side wall of the deck 10, and a hook portion 108 to be engaged with a guide groove 18 longitudinally formed at the side wall of the deck 10 in the moving direction of the sliding member 100 in order to prevent the sliding member 100 from fluctuating left and right and disengaging upward.

As shown in FIG. 3, the pivoting member 110 is installed on the deck 10 to pivot around a shaft 115, and provided with a gear portion consisting of two teeth 111 and 112 and an arm portion 113. A projection 114 is formed at a free end of the arm portion 113. In a state in which the disk tray 20 is extracted from the housing 1, as shown in FIG. 3, the projection 114 of the pivoting member 10 is inserted between the pushing member 31 and the rack member 40. Also, in the above state, the pivoting member 110 is prevented from pivoting counterclockwise in FIG. 3 by the interference between the tooth 112 and the gear member 90, and clockwise by a stopper (not shown) formed on the deck 10.

As shown in FIGS. 3 and 5, a moving member 150 is installed at a position facing the sliding is member 100 in the deck 10 to be reciprocally movable in the moving direction of the sliding member 100. The moving member 150 is, as with the sliding member 100, provided with an inner wall portion 156 contacting the inner surface of the side wall of the deck 10, an outer wall portion 157 contacting the outer surface of the side wall of the deck 10, and a hook portion 158 to be engaged with a guide groove 18 longitudinally formed at the side wall of the deck 10 in the moving direction of the sliding member 100.

Figure 8:
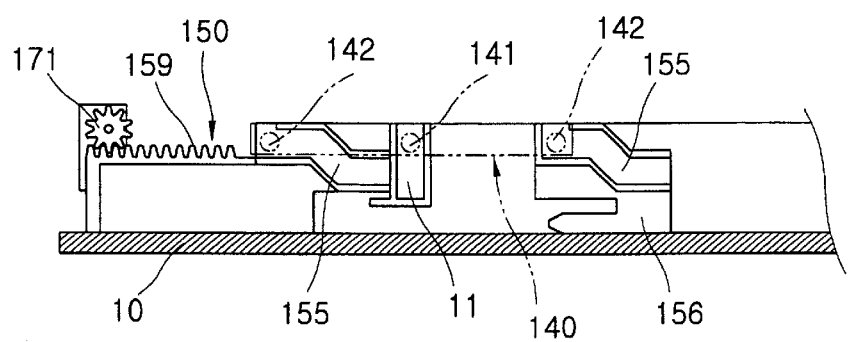
FIG. 8 is a schematic side view of the moving member shown in FIG. 5 shown from the perspective in the direction indicated by arrow Z, in accordance with the principles of the present invention.

Turn now to FIG. 8, which is a schematic side view of the moving member shown in FIG. 5 shown from the perspective in the direction indicated by arrow Z, in accordance with the principles of the present invention. Referring to FIGS. 3, 5, and 8, slant cam portions 155, as shown in FIG. 8, corresponding to the slant cam portions 105 of the sliding member 100 are formed at the inner surface of the moving member 150. When the sliding member 100 moves, the moving member 150 is moved by a moving member driving unit in the same direction as the sliding member 100. In this embodiment, the moving member driving unit is provided with: a first connecting rack portion 109 formed on the upper surface of the sliding member 100 along the moving direction of the sliding member 100; a second connecting rack portion 159 disposed on the upper surface of the moving member 150 parallel to the first connecting rack portion 109; and a connecting gear 170 rotatably installed at the front part of the deck 10. Connecting gear portions 171 at both ends of the connecting gear 170 engage with the first connecting rack portion 109 and the second connecting rack portion 159 simultaneously.

With continued reference to FIGS. 3, 5, and 8, second guide portions 142 of a chuck supporter 140, shown in FIG. 5 but not shown in FIG. 3, are inserted into the slant cam portions 105 of the sliding member 100 and the slant cam portions 155 of the moving member 150, respectively. The chuck supporter 140, which rotatably supports a chuck 130 for clamping a disk together with the turntable 15, is provided with first guide portions 141 in addition to the second guide portions 142. The first guide portions 141 are, as shown in FIG. 5, inserted into guide rails 11, respectively. The guide rails 11 are installed to be parallel to the rotating axis of the turntable 15. The chuck 130 can be moved by a chuck moving unit in the direction toward or away from the turntable 15 as described below when the sliding member 100 included in the clutch unit moves. The chuck moving unit includes the guide rails 11, the slant cam portions 105 of the sliding member 100, the moving member 150, the moving member driving unit, and the chuck supporter 140.

Refer now to FIGS. 9 through 15, which illustrate schematic plan views sequentially illustrating the states of operation of the present invention, in accordance with the principles of the present invention. In the disk player constructed as above, the movement of the disk tray 20 and the transportation of the optical pickup 30 are explained with reference to FIG. 3 and FIGS. 9–15. FIGS. 10 through 15 primarily illustrate members or portions necessary for explanation and omit members or portions which are not necessary for the explanation.

At first, in a state in which the disk tray 20 is extracted from the housing 1, as shown in FIG. 3, when the driving motor 50 is operated, the first gear 60 is rotated by the driving power transferred via the pinion 51 and the intermediate gear 55. Accordingly, the disk tray 20 is inserted into the housing 1 by the first rack portion 211 engaged with the small gear portion 62 of the first gear 60 in the direction indicated by arrow A1 of FIG. 3. When the driving motor 50 rotates, the second gear 70 engaged with the pinion 51 is simultaneously rotated with the first gear 60. However, though the second gear 70 is rotated, the optical pickup 30 fixed to the rack member 40 remains at the position shown in FIG. 3 during an inserting period of the disk tray 20 since the rack member 40 does not engage with the second gear 70 in the state shown in FIG. 3.

Figure 9:
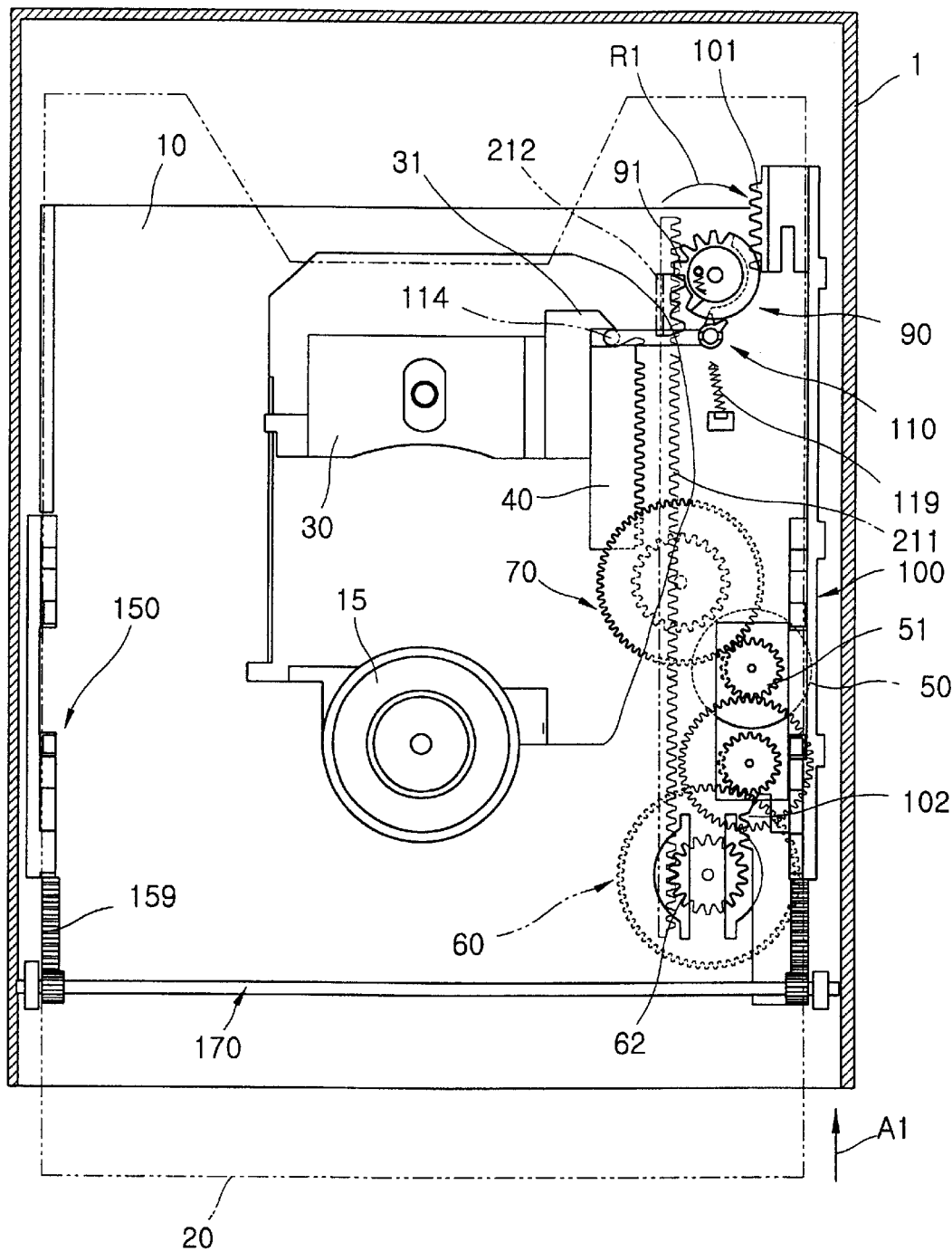
FIGS. 9 through 15 are schematic plan views sequentially illustrating the states of operation of the present invention, in accordance with the principles of the present invention.
Figure 10:
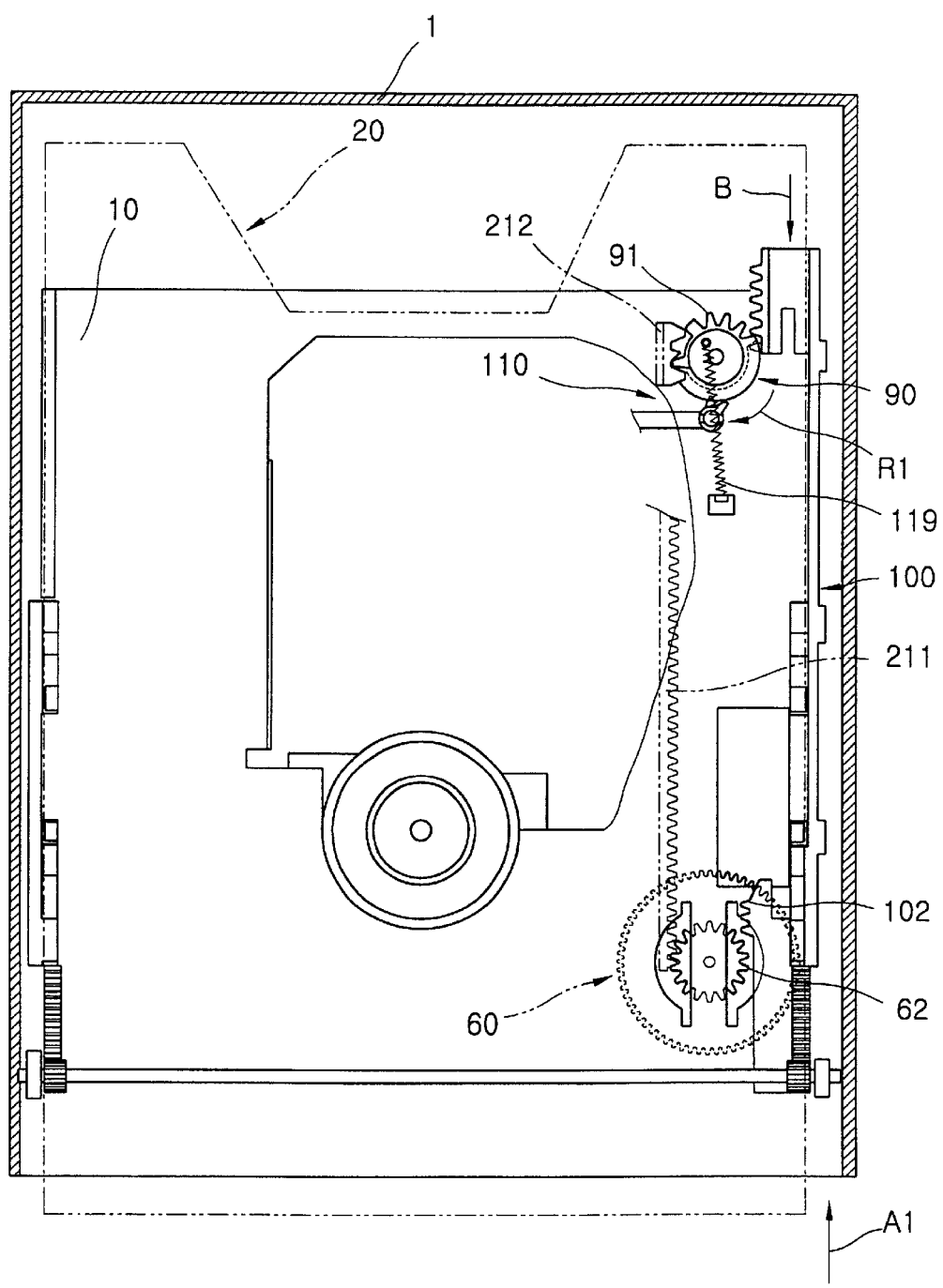
Figure 11:
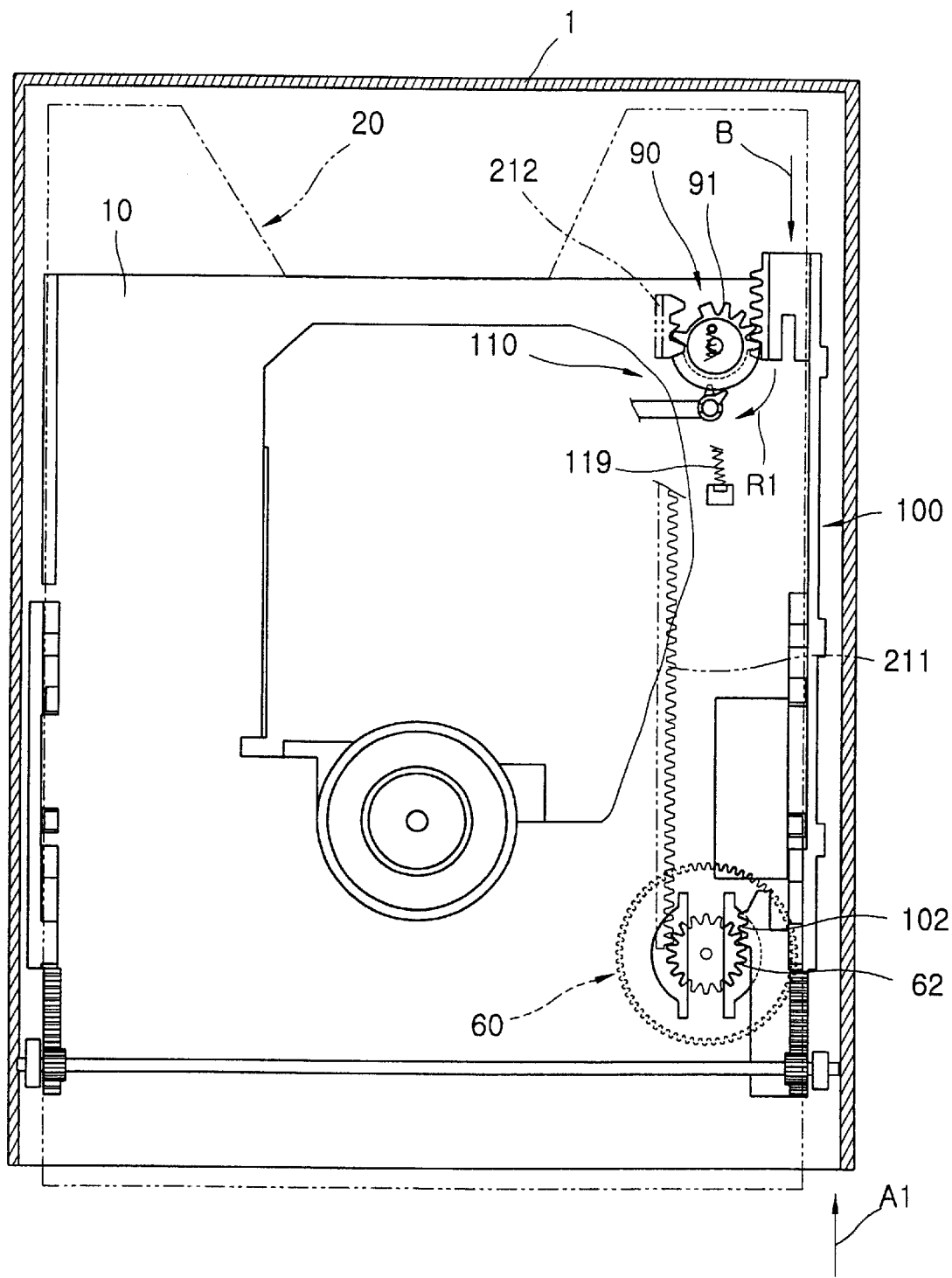

As described above, while the disk tray 20 is being inserted into the housing 1 by the driving motor 50, the second rack portion 212 begins to engage with the gear portion 91 of the gear member 90, as shown in FIG. 9. Then, the disk tray 20 continues to be inserted into the housing 1 by engaging with the first rack portion 211 and the small gear portion 62 of the first gear 60, and rotates the gear member 90 toward the second rotational position by the second rack portion 212 and the gear portion 91 being engaged therewith. That is, the gear member 90 is rotated in the direction indicated by arrow R1. While the gear member 90 is rotated toward the second rotational position, the gear portion 91 of the gear member 90 begins to engage with the first clutching rack portion 101 of the sliding member 100, as shown in FIG. 10. Then, in the state shown in FIG. 10, as the disk tray 20 continues moving in the direction indicated by arrow A1 of FIG. 10, the sliding member 100 moves in the direction to be projected from the housing 1. That is, the sliding member 100 moves in the direction indicated by arrow B of FIG. 10 due to the gear engagement of the second rack portion 212 to the gear portion 91, and the gear engagement of the gear portion 91 to the first clutching rack portion 101. While the sliding member 100 moves in the direction of arrow B of FIG. 11, the second clutching rack portion 102 engages with the small gear portion 62 of the first gear 60, as shown in FIG. 11. Then, the sliding member 100 is moved by the first gear 60 rotated by the driving motor 50, shown in FIG. 9, in the direction indicated by arrow B of FIG. 11. While the sliding member 100 is moved by the first gear 60, the gear member 90 continues to be rotated in the direction indicated by arrow R1 of FIG. 11 due to the engagement of the gear portion 91 to the first clutching rack portion 101 of the sliding member 100. The gear member 90 which continues to be rotated moves the disk tray 20 in the direction indicated by arrow A1 of FIG. 11 due to the engagement of the gear portion 91 to the second rack portion 212. Accordingly, as shown in FIG. 12, the disk tray 20 is inserted into the housing 1 until the first rack portion 211 is disengaged from the first gear 60 and the second rack portion 212 is disengaged from the gear portion 91, and then ceases to move at that position, thus completing the insertion movement of the disk tray 20.

After insertion of the disk tray 20 is completed, the driving motor 50, as shown in FIG. 9, continues to operate to rotate the first gear 60 in the same direction, accordingly the optical pickup 30 slides by the driving motor 50. These procedures are explained in detail below.

Figure 12:
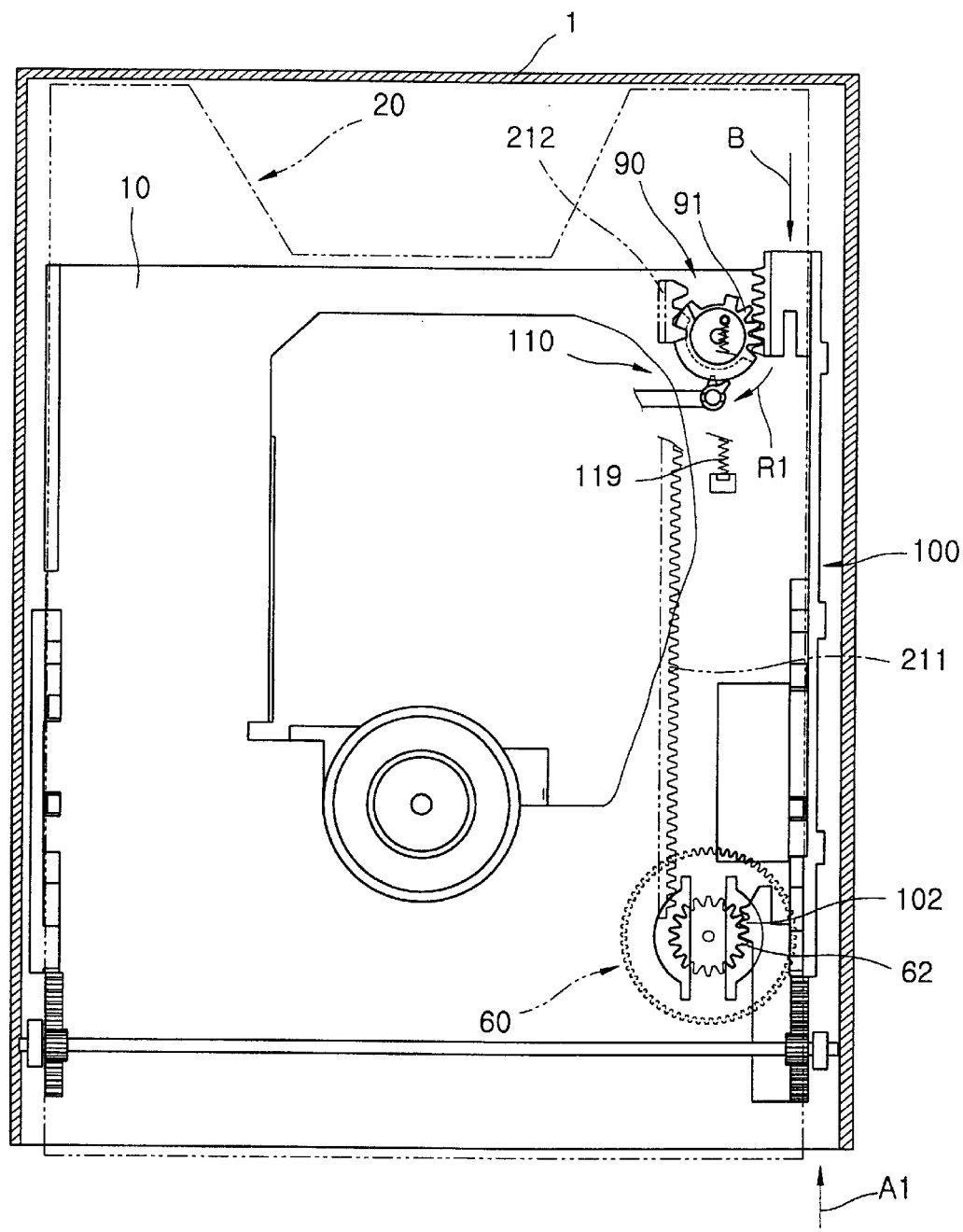

In the state shown in FIG. 12, when the sliding member 100 is moved by the first gear 60 in the direction indicated by arrow B of FIG. 12, the gear member 90 continues to be rotated in the direction indicated by arrow R1 of FIG. 12 due to the engagement of the first clutching rack portion 101 to the gear portion 91. While the gear member 90 is rotated in the direction indicated by arrow R1, the front tooth of the gear portion 91 of the gear member 90 comes into contact with the tooth 112 of the pivoting member 110. Next, as the gear portion 91 of the gear member 90 engages with the teeth 111 and 112, it pivots the pivoting member 110 in the direction indicated by arrow R2 of FIG. 13. While the pivoting member 110 is rotated in the direction indicated by arrow R2 of FIG. 13, the projection 114 formed at one end of the arm portion 113 of the pivoting member 110 rotated by the driving motor 50 presses the rack member 40 to engage with the second gear 70, as shown in FIG. 14. Once the rack member 40 engages with the second gear 70, the optical pickup 30 moves in the direction indicated by arrow C of FIG. 14 due to the engagement of the second gear 70 to the rack member 40. While the optical pickup 30 moves, the pushing member 31 presses the projection 114 formed at one end of the arm portion 113 of the pivoting member 110 for the pivoting member 110 to rotate, as shown in FIG. 15. While the pivoting member 110 is pressed by the pushing member 31 from the state shown in FIG. 14 to the state shown in FIG. 15, the gear member 90 is rotated due to the engagement of the gear portion 91 to the teeth 111 and 112 of the pivoting member 110 to be positioned at the second rotational position, as shown in FIG. 14. In addition, while the gear member 90 is rotated to the second rotational position, the sliding member 100 is moved in the direction indicated by arrow B of FIG. 14 by engaging with the first clutching rack portion 101 and the gear portion 91 of the gear member, and the second clutching rack portion 102 is disengaged from the first gear 60. In such a state, though the first gear 60 is rotated, the sliding member 100 disengaged from the first gear 60 does not move any further. In the state shown in FIG. 15, the tension coil spring 119 provides an elastic force to prevent the gear member 90 from rotating back to the first rotational position. Therefore, the sliding member 100 which engages with the gear member 90 by the engagement of the gear portion 91 to the first clutching rack portion 101 is obstructed to move in an opposite direction. Since an elastic force is applied to the gear member 90 and the sliding member 100 by the tension coil spring 119 as described above, the fluctuation of the gear member 90 and the sliding member 100 are suppressed even when fluctuations occur in a disk player by undesirable external forces such as vibration.

As described above, while the pivoting member 110 is pressed by the pushing member 31 from the state shown in FIG. 14 to the state shown in FIG. 15, the projection 114 positioned between the pushing member 31 and the rack member 40 is able to escape from a gap between the pushing member 31 and the rack member 40. Accordingly, when the second gear 70 continues to rotate, the optical pickup 30 can move to a position near the turntable 15, as shown by the imaginary lines of FIG. 15, without interfering with the projection 114. Therefore, when the range of sliding movement of the optical pickup 30 is set between a position drawn by the visible lines and the position drawn by the imaginary lines in FIG. 15, the disk tray 20, the sliding member 100, and other related components, do not move while the optical pickup 30 is sliding in order to read information from a disk.

Figure 7:
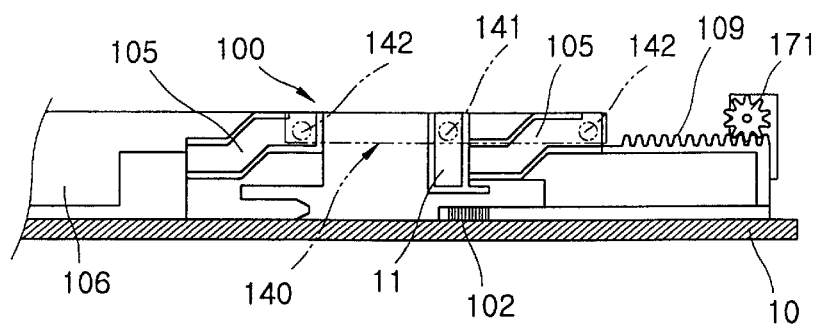
FIG. 7 is a schematic side view of the sliding member shown in FIG. 5 shown from the perspective in the direction indicated by arrow Y, in accordance with the principles of the present invention.
Figure 16:
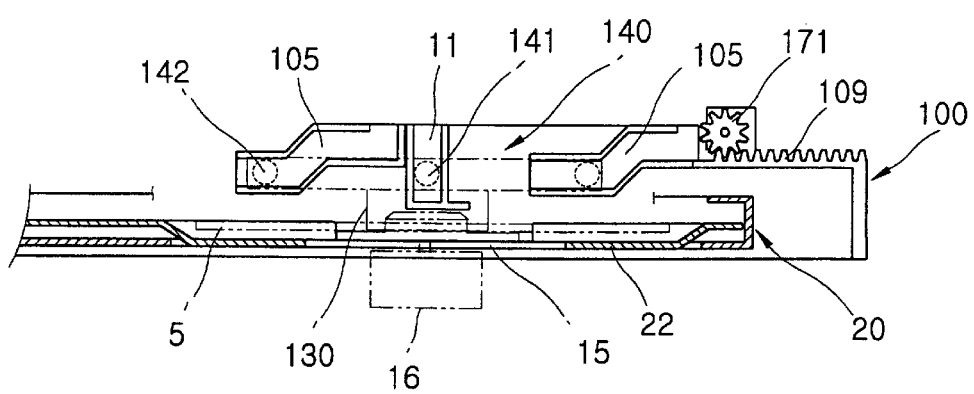
FIG. 16 is a schematic inner side view illustrating a state in which a chuck is lowered from the state shown in FIG. 7 to clamp a disk, in accordance with the principles of the present invention.

Turn now to FIG. 16, which is a schematic inner side view illustrating a state in which a chuck is lowered from the state shown in FIG. 7 to clamp a disk, in accordance with the principles of the present invention. Refer to FIG. 16, and additionally to FIGS. 7, 10, 12, 14, and 15. While the sliding member 100 moves from a position shown in FIG. 10 to a position shown in FIG. 15, the moving member 150 moves in the same direction as the sliding member 100 by the connecting gear 170 which engages with both the first connecting rack portion 109 of the sliding member 100 and the second connecting rack portion 159 of the moving member 150. Also, while the sliding member 100 moves from a position shown in FIG. 12 to a position shown in FIG. 14, the position of the slant cam portion 105 of the sliding member 100 changes. Accordingly, the chuck supporter 140, the second guide portions 142 of which are inserted into the slant cam portion 105 and the first guide portions 141 of which are inserted into the guide rails 11 of the deck 10, as shown in FIG. 7, descend as the first guide portions 141 is guided by the guide rails 11, as shown in FIG. 16. The descending chuck supporter 140 lowers the disk supporter 22 of the disk tray 20 completely inserted into the housing 1 with respect to the tray body 21. While the disk supporter 22 is lowered, the disk 5 which is laid on and supported by the disk supporter 22 is laid on the turntable 15 and the upper surface of the disk 5 is pressed by the chuck 130 supported by the chuck supporter 140, thus clamping the disk 5.

When the turntable 15 is rotated by the spindle motor 16, the clamped disk 5 rotates simultaneously with the turntable 15. While the disk 5 rotates as above, the optical pickup 30 reads information from the disk 5, moving in a radial direction with respect to the disk 5 under the disk 5.

When a user is trying to extract the disk tray 20 from the housing 1 in order to take out the clamped disk 5, as shown in FIG. 16, the first gear 60 and the second gear 70 are rotated in a direction opposite to that in which the disk tray 20 is inserted into the housing 1 by rotating the driving motor 50 similarly in the opposite direction. In such a case, as the rack member 40 is moved by the second gear 70 to a position, as shown in FIG. 14, it presses the projection 114 for the pivoting member 110 to move in the opposite direction of the arrow R2. Accordingly, the sliding member 100 engages with the first gear 60 via the second clutching rack portion 102. While the pivoting member 110 rotates from the state shown in FIG. 15 to the state shown in FIG. 14, the projection 114 is inserted between the pushing member 31 and the rack member 40.

Figure 13:
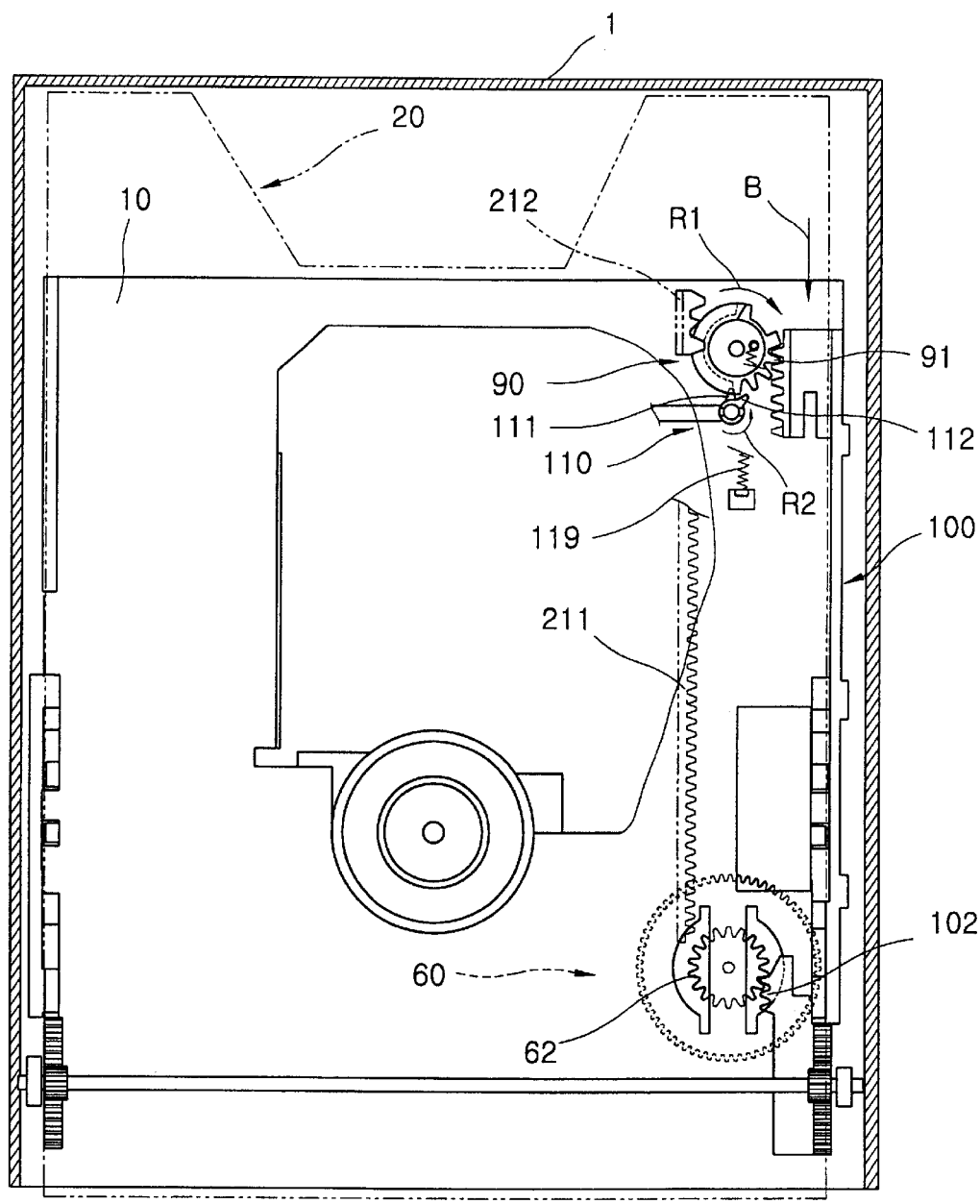
Figure 14:
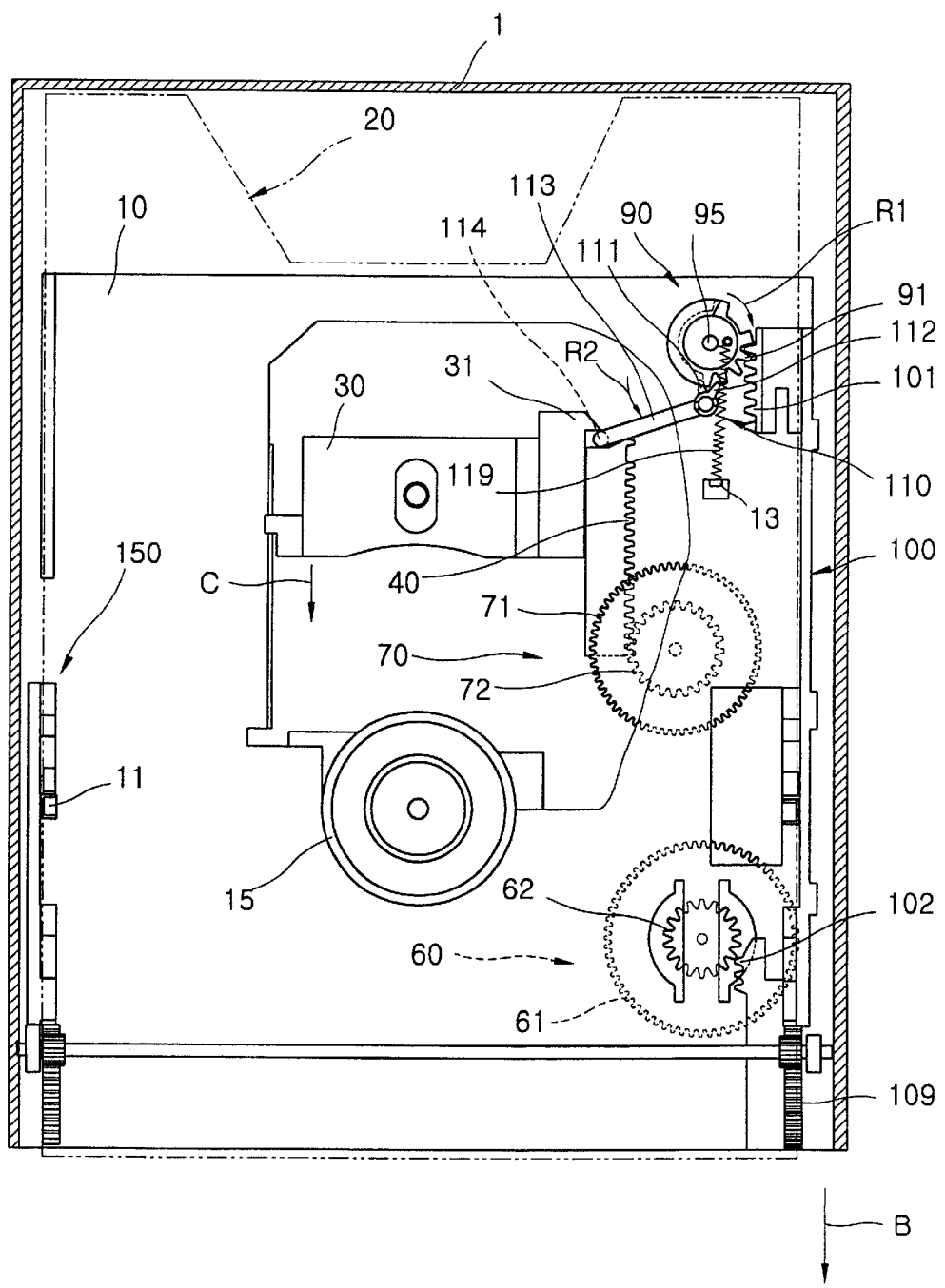

As the sliding member 100 engaged with the first gear 60 is moved toward the inside of the housing 1 by the first gear 60, it moves the pivoting member 110 to a state shown in FIG. 13. While the pivoting member 110 pivots from the state shown in FIG. 14 to the state shown in FIG. 13, the projection 114 of the pivoting member 110 presses the pushing member 31 to disengage the rack member 40 attached to the optical pickup 30 from the second gear 70. Then, the disk tray 20 is extracted from the housing 1 through a procedure reverse to that of the insertion of the disk tray 20.

Although embodiments according to the principles of the present invention have been described, a disk player according to the principles of the present invention does not necessarily need to have a structure identical to the structure described above, and various modifications maybe made without departing from the spirit and scope of the invention.

In embodiments described above, the rack member 40 is attached to the optical pickup 30 with intervention of the pushing member 31. Also in embodiments described above, the optical pickup 30, the rack member 40, and the pushing member 31 are described and shown as being secured to each other. However, variations of the aforementioned arrangement of features can be made according to the principles of the present invention. For example, see the discussion of FIG. 17 below.

Figure 17A:
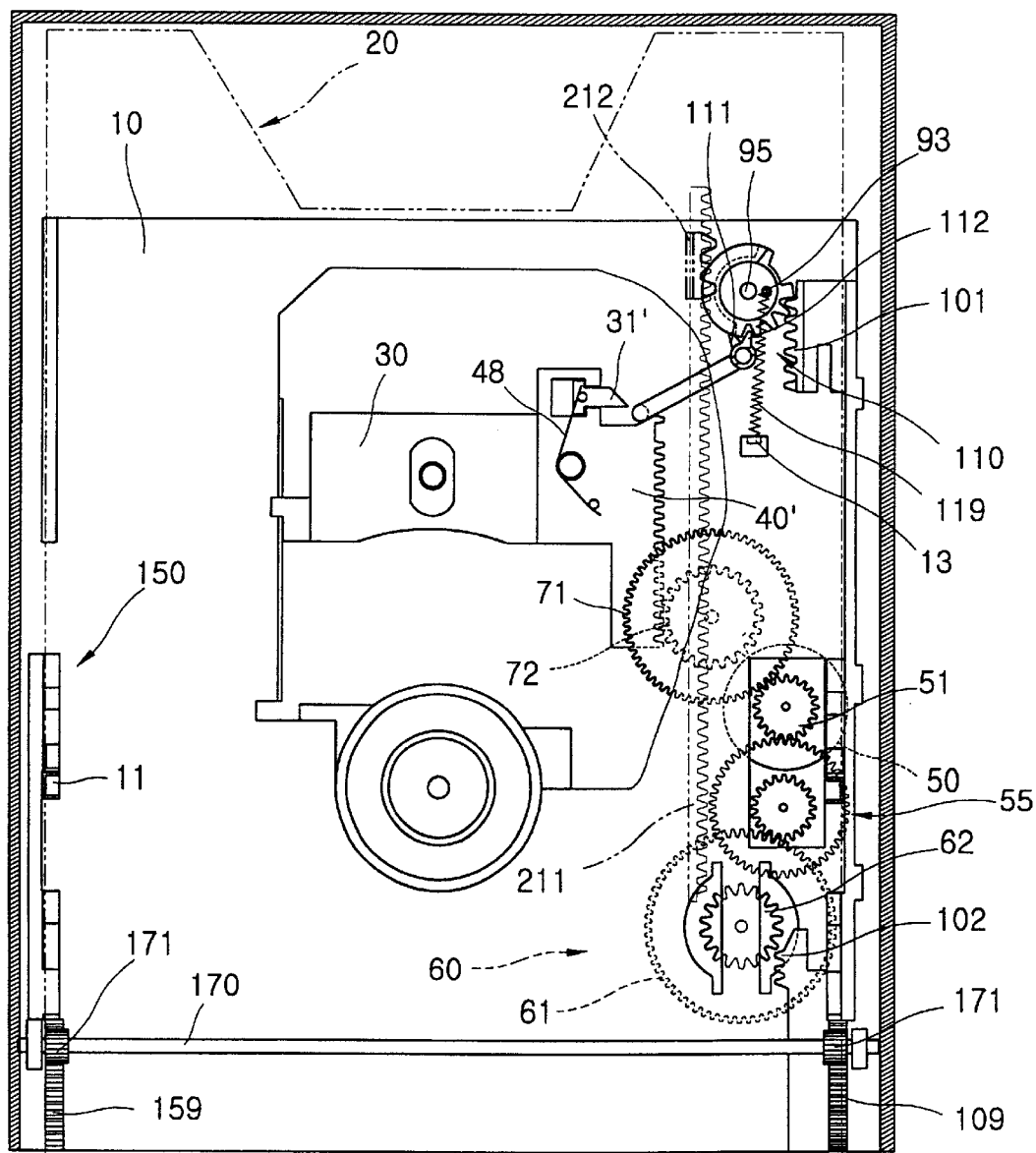
FIG. 17 is a schematic plan view illustrating another embodiment of a disk player, in accordance with the principles of the present invention.
Figure 17B:
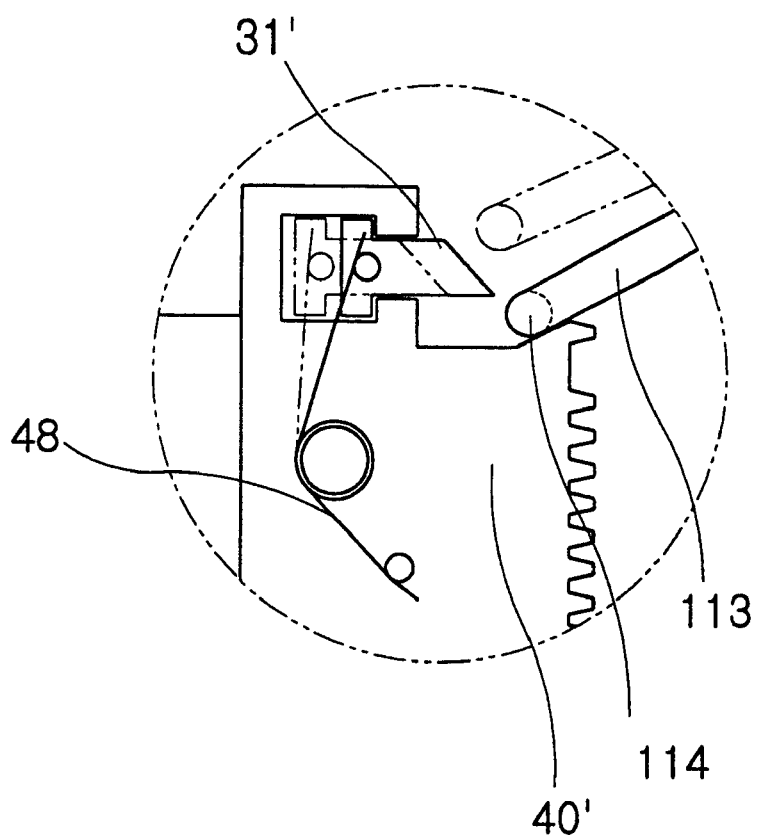

Turn now to FIG. 17, which is a schematic plan view illustrating another embodiment of a disk player, in accordance with the principles of the present invention. Refer to the optical pickup 30, the rack member 40' and the pushing member 31' shown in FIG. 17. FIG. 17 is a drawing corresponding to FIG. 15, for explaining an embodiment. Since members or portions in FIG. 17 which have similar reference numerals to those in FIG. 15 have similar functions, detailed explanations concerning them are omitted. Referring to FIG. 17, a rack member 40' which has similar functions to the rack member 40', as shown in FIG. 15, of the above embodiment, is attached to an optical pickup 30. In addition, a pushing member 31' which has similar functions to the pushing member 31, as shown in FIG. 15, of the above embodiment, is installed at one end of the rack member 40' to be slidable within a predetermined distance in the direction perpendicular to the moving direction of the rack member 40' and is elastically biased by a spring 48 to move toward a rack portion of the rack member 40'.

When the optical pickup 30 in the state shown in FIG. 17 is moved in the direction opposite to the direction indicated by arrow C of FIG. 15 in order to extract a disk tray 20 from a housing 1, a projection 114 of the arm portion 113 presses the pushing member 31' to a position shown by the imaginary lines and is able to contact the rack member 40'. The above occurs even though an arm portion 113, which is intended to be at the position shown by the visible lines, is more or less rotated to the position shown by the imaginary lines, due to such instances as a loosely fitted pivoting member 100. When the projection 114 contacts the rack member 40', the pushing member 31' is projected back to the state shown by the visible lines by the restoring force of the spring 48. Accordingly, the projection 114 is inserted between the pushing member 31' and the rack member 40' as in the above embodiment.

Though the disk player of this embodiment is arranged so that the turntable 15 is fixed at a position and a chuck 130 is lowered to clamp a disk, the present invention is not necessarily applied to a disk player having such a structure. For example, even if a disk player is employed in which a chuck is fixed at a position and a turntable is heightened within a housing to clamp a disk, it should be understood that movements of a disk tray and a optical pick can be performed by one driving motor.

As described above, in a disk player according to the present invention, insertion/extraction of a disk tray and transportation of an optical pickup are performed by one driving motor and a clutch unit selectively transfers a rotational force to the disk tray or the optical pickup. Therefore, a disk player according to the present invention exhibits a simple structure. Accordingly, the manufacturing cost can be lowered and the weight and size can be reduced.

The disk 5 shown in FIG. 1 can be a disk selected from the group consisting of a compact disk-read only memory (CD-ROM), a digital versatile disk (DVD), a compact disk-recordable (CD-R), a compact disk-erasable (CD-E), a phase change disk (PCD), and a phase disk (PD). Accordingly, the optical pickup 30 shown in FIG. 3 can be a unit compatible with the disk selected from the group shown above, enabling data to be read from the disk, written to the disk, or both.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A disk player apparatus, comprising:
   a housing;
   a disk tray movably coupled to said housing, moving in a first direction along a first path of conveyance to a first location inside said housing when inserted into said housing, moving in a second direction along the first path of conveyance to a second location outside said housing when ejected from said housing, receiving a disk when positioned at the second location, transporting the disk into said housing when said disk tray is inserted into said housing;
   a turntable rotatably coupled to said housing and receiving the disk;
   an optical unit movably coupled to said housing reading information recorded on the disk on said turntable, moving along a second path of conveyance within said housing;
   a motor installed in said housing;
   a tray driving unit moving said disk tray along the first path of conveyance by power transferred from said motor, said tray driving unit further comprising:
      a first gear installed in said housing and rotated by said motor;
      a first rack portion disposed at said disk tray and extended along the first path of conveyance of said disk tray, being engaged to said first gear when said disk tray is being moved, and being disengaged from said first gear when said disk tray is at the first location inside said housing;
   an optical unit transfer system moving said optical unit along the second path of conveyance by power transferred from said motor, said optical unit transfer system further comprising:
      a second gear installed in said housing and driven by said motor;
      a rack member attached to said optical unit and disposed to be extended along the second path of conveyance of said optical unit, being disengaged from said second gear when said first rack portion is engaged to said first gear, and being engaged to said second gear when said first rack portion is disengaged from said first gear; and
   a clutch unit selectively transferring power of said motor to a selected one of said tray driving unit and said optical unit transfer system, said clutch unit further comprising:
      a gear member rotatable coupled to said housing, rotating between a first rotational position and a second rotational position being rotated in a first rotational direction to the first rotational position when said disk tray is ejected from said housing, and being rotated in a second rotational direction to the second rotational position when said disk tray is inserted into said housing, the first rotational direction being opposite to the second rotational direction;
      a gear portion formed at a circumferential surface portion of said gear member;
      a second rack portion coupled to said disk tray, engaging to said gear portion of said gear member when said disk tray is inserted into said housing, disengaging from said gear portion of said gear member when said disk tray is ejected from said housing, and rotating said gear member in the second rotational direction to the second rotational position when said disk tray is inserted into said housing;
      a sliding member movably coupled to said housing, moving along a third path of conveyance;
      a first clutching rack portion coupled to said sliding member;
      a second clutching rack portion coupled to said sliding member;
      said sliding member moving in a first direction along the third path of conveyance when said first clutching rack portion engages to said gear portion of said gear member rotated to the second rotational position;
      when said sliding member is moved in the first direction along the third path of conveyance, said second clutching rack portion engages to said first gear said sliding member continues to move in the first direction along the third path of convevance by power transferred from said motor, said disk tray becomes completely inserted into said housing by said first clutching rack portion, said gear portion of said gear member and said second rack portion, and said first rack portion of said disk tray disengages from said first gear;
      a pivoting member rotatably coupled to said housing and having a gear part engaged to said gear portion of said gear member when said gear member is rotated to the second rotational position;
      when said pivoting member is pivoted due to said gear part becoming engaged to said gear portion of said gear member rotated to the second rotational position, said pivoting member pressing said rack member in a pushing direction causing said rack member to engage to said second gear causing said optical unit to move by power transferred from said motor; and
      a pushing member coupled to said optical unit to simultaneously move with said optical unit, said pushing member rotating said gear member at the second rotational position by further rotating said pivoting member, said pivoting member pressing said rack member in the pushing direction, and said pushing member causing said second clutching rack member to disengage from said first gear by moving said sliding member.

2. A disk player apparatus, comprising:
   a housing;
   a disk tray movably coupled to said housing, moving in a first direction along a first path of conveyance to a first location inside said housing when inserted into said housing, moving in a second direction along the first path of conveyance to a second location outside said housing when ejected from said housing, receiving a disk when positioned at the second location, transporting the disk into said housing when said disk tray is inserted into said housing;

a turntable rotatably coupled to said housing and receiving the disk;

an optical unit movably coupled to said housing reading information recorded on the disk on said turntable, moving along a second path of conveyance within said housing;

a motor installed in said housing;

a tray driving unit moving said disk tray along the first path of conveyance by power transferred from said motor, said tray driving unit further comprising:
  a first gear installed in said housing and rotated by said motor;
  a first rack portion disposed at said disk tray and extended along the first path of conveyance of said disk tray, being engaged to said first gear when said disk tray is being moved, and being disengaged from said first gear when said disk tray is at the first location inside said housing;

an optical unit transfer system moving said optical unit along the second path of conveyance by power transferred from said motor; and a clutch unit selectively transferring power of said motor to a selected one of said tray driving unit and said optical unit transfer system, said clutch unit further comprising:
  a gear member rotatably coupled to said housing, rotating between a first rotational position and a second rotational position, being rotated in a first rotational direction to the first rotational position when said disk tray is ejected from said housing, and being rotated in a second rotational direction to the second rotational position when said disk tray is inserted into said housing, the first rotational direction being opposite to the second rotational direction;
  a gear portion formed at a circumferential surface portion of said gear member;
  a second rack portion coupled to said disk tray, engaging to said gear portion of said gear member when said disk tray is inserted into said housing, disengaging from said gear portion of said gear member when said disk tray is ejected from said housing, and rotating said gear member in the second rotational direction to the second rotational position when said disk tray is inserted into said housing;
  a sliding member movably coupled to said housing, moving along a third path of conveyance;
  a first clutching rack portion coupled to said sliding member; and
  a second clutching rack portion coupled to said sliding member;
  said sliding member moving in a first direction along the third path of conveyance when said first clutching rack portion engages to said gear portion of said gear member rotated to the second rotational position;
  when said sliding member is moved in the first direction along the third path of conveyance, said second clutching rack portion engages to said first gear, said sliding member continues to move in the first direction along the third path of conveyance by power transferred from said motor, said disk tray becomes completely inserted into said housing by said first clutching rack portion, said gear portion of said gear member and said second rack portion, and said first rack portion of said disk tray disengages from said first gear.

3. The apparatus of claim 2, further comprising:
  said optical unit transfer system comprising:
    a second gear installed in said housing and driven by said motor; and
    a rack member attached to said optical unit and disposed to be extended along the second path of conveyance of said optical unit, being disengaged from said second gear when said first rack portion is engaged to said first gear, and being engaged to said second gear when said first rack portion is disengaged from said first gear;
  said clutch unit further comprising:
    a pivoting member rotatable coupled to said housing and having a gear part engaged to said gear portion of said gear member when said gear member is rotated to the second rotational position;
    when said pivoting member is pivoted due to said gear part becoming engaged to said gear portion of said gear member rotated to the second rotational position, said pivoting member pressing said rack member in a pushing direction causing said rack member to engage to said second gear causing said optical unit to move by power transferred from said motor; and
    a pushing member coupled to said optical unit to simultaneously move with said optical unit, said pushing member rotating said gear member at the second rotational position by further rotating said pivoting member, said pivoting member pressing said rack member in the pushing direction, and said pushing member causing said second clutching rack member to disengage from said first gear by moving said sliding member.

4. The apparatus of claim 1, wherein said clutch unit further comprises an elastic member preventing said gear member at the first rotational position from freely rotating toward the second rotational position.

5. The apparatus of claim 1, wherein said clutch unit further comprises an elastic member, and when said sliding member has moved in the first direction along the third path of conveyance said elastic member preventing said sliding member from freely moving in a second direction along the third path of conveyance, the first direction along the third path of conveyance being opposite to the second direction along the third path of conveyance.

6. The apparatus of claim 1, wherein the disk is selected from a group consisting of a compact disk-read only memory, a digital versatile disk, a compact disk-recordable, a compact disk-erasable, a phase change disk, and a phase disk.

* * * * *